(12) United States Patent
Whyatt et al.

(10) Patent No.: US 6,653,571 B1
(45) Date of Patent: Nov. 25, 2003

(54) HIGH VOLTAGE ELECTRICAL INSULATION MATERIAL

(75) Inventors: Malcolm Neil Whyatt, Swindon (GB); John David Stoker, Swindon (GB); Mary Elizabeth Hinton, Ross-on-Wye (GB); Stephen Day, Swindon (GB)

(73) Assignee: Tyco Electronics, Fuquay-Varina, NC (US)

( * ) Notice: Subject to any disclaimer, the term of this patent is extended or adjusted under 35 U.S.C. 154(b) by 0 days.

(21) Appl. No.: 09/463,336

(22) PCT Filed: Jul. 28, 1998

(86) PCT No.: PCT/GB98/02265
§ 371 (c)(1),
(2), (4) Date: Jan. 21, 2000

(87) PCT Pub. No.: WO99/06479
PCT Pub. Date: Feb. 11, 1999

(30) Foreign Application Priority Data

Jul. 30, 1997 (GB) .............................................. 9715946

(51) Int. Cl.$^7$ ............................. H01B 7/28; H01B 3/30; C08K 5/092
(52) U.S. Cl. ................... 174/137 B; 174/209; 524/307; 524/314; 524/563; 524/570
(58) Field of Search ................. 524/307, 314, 524/563, 570; 174/209, 137 B

(56) References Cited

U.S. PATENT DOCUMENTS

| | | | | |
|---|---|---|---|---|
| 3,387,993 A | * | 6/1968 | Flowers et al. | 428/499 |
| 3,922,442 A | * | 11/1975 | North et al. | 428/447 |
| 3,988,270 A | * | 10/1976 | Willis et al. | 524/15 |
| 4,189,392 A | | 2/1980 | Penneck et al. | 252/63.2 |

FOREIGN PATENT DOCUMENTS

| | | | | |
|---|---|---|---|---|
| DE | 1228170 A | * | 11/1966 | |
| JP | 62153354 A | * | 7/1987 | ............ C09D/3/52 |
| JP | 03045638 | * | 2/1991 | ................ 524/267 |
| JP | 03124767 A | * | 5/1991 | ......... C08L/101/00 |
| JP | 08259482 | * | 10/1996 | ........... C07C/43/12 |

OTHER PUBLICATIONS

Translation to Furuya et al. (JP 08259482) 10/96.*
Abstract to Furuya et al. (JP 08259482) 10/96.*
Chemical Abstract No. 126:67603 & JP 080259501 (Hitachi), Oct. 8, 1996; categories X, Y.
Chemical Abstract No. 126:31072 & JP 080259482 (Hitachi), Oct. 8, 1996; categories X, Y.
Chemical Abstract No. 124:344277 & Z.L. Wang et al, *J. Macromol. Sci, Pure Appl. Chem.* (1996), 33(5), p. 599–612; categories X, Y.
Chemical Abstract No. 122:68801 & L.M. Wilson, *Macromolecules* (1995), 28(1), p. 325–330; categories X, Y.
Patent Abstracts of Japan, vol. 097, No. 002, Feb. 28, 1997 & JP & JP 08 0259501 (Hitachi Maxell Ltd), Oct. 8, 1996; category A.

* cited by examiner

*Primary Examiner*—Kelechi Egwim
(74) *Attorney, Agent, or Firm*—Myers Bigel Sibley & Sajovec, P.A.

(57) ABSTRACT

An electrical insulation material which is suitable for high voltage applications, the material including (a) a polymeric material, and (b) an additive incorporated into the polymeric material, the additive including a compound of the formula:

$$Rf-O_2C(CH_2)_xCO-R'f$$

where Rf and R'f are fluorine-substituted aliphatic chains, and x is an integer in the range 9 to 18.

4 Claims, 3 Drawing Sheets

Fig.3.

|  | SAMPLE 1, x=4 | SAMPLE 2, x=7 | SAMPLE 3, x=10 | SAMPLE 4, x=14 | SAMPLE 5, x=20 |
|---|---|---|---|---|---|
| NO ELECTRICAL DISCHARGE (CONTROL) | 61.32 | 58.12 | 64.18 | 79.13 | 89.42 |
| 20 MINUTES AFTER DISCHARGE | 14.18 | 22.12 | 45.17 | 66.10 | 48.01 |
| 3 HOURS AFTER DISCHARGE | 12.36 | 18.88 | 40.45 | 70.14 | 25.13 |
| 24 HOURS AFTER DISCHARGE | 14.12 | 29.14 | 56.17 | 65.17 | 37.39 |
| % RECOVERY OF CONTACT ANGLES |  |  |  |  |  |
| 20 MINUTES AFTER DISCHARGE | 23.12 | 38.06 | 70.38 | 83.53 | 53.69 |
| 3 HOURS AFTER DISCHARGE | 20.16 | 32.48 | 63.03 | 88.64 | 28.10 |
| 24 HOURS AFTER DISCHARGE | 23.03 | 50.14 | 87.52 | 82.36 | 41.81 |

HIGH VOLTAGE ELECTRICAL INSULATION MATERIAL

BACKGROUND OF THE INVENTION

1. Field of the Invention

The present invention relates to electrical insulation materials which are suitable for high voltage applications. In particular, the invention relates to additives for polymeric insulation materials, especially for enhancing the water repellent properties of such materials and/or for suppressing the occurrence of leakage currents on such materials at high voltages.

2. Introduction to the Invention

In high voltage applications (e.g. 1 kV or above), the condensation of water on the surface of polymeric insulation material can result in leakage currents flowing across the surface of the insulation material. These leakage currents normally cause the temperature of the insulation material to rise, leading to evaporation of the moisture and the formation of so-called dry bands. This in turn generally leads to electrical discharges on the surface of the insulation. This electrical discharge activity produces corrosive by-products such as ozone, nitrogen oxides, sulphur dioxide, and ultra-violet radiation. If the insulation material is exposed to the outdoors environment, such by-products may be blown or washed away, and they may therefore cause little or no damage to the polymeric insulation material. However, if the insulation material is protected to some degree from the external environment (for example if it is enclosed in a cabinet) the by-products of the electrical discharge activity may remain and attack the surface of the polymeric insulation material. Electrochemical processes occurring on the surface of the insulation material during electrical discharges often cause electrochemical oxidation of the insulation material.

The effect of this electrochemical oxidation is to generate polar chemical species, such as carboxylic acids for example, on the surface of the polymeric insulation material. This results in the surface of the insulation material becoming less hydrophobic and more hydrophilic. Therefore water condensing on the surface of the insulation material will tend to wet the surface more readily, thereby causing higher leakage currents and greater electrical discharge activity. This of course leads to the production of more corrosive by-products which attack the surface of the insulation material, degrading it further. In moist conditions, the insulation material is therefore subject to a cycle of high leakage currents, electrical discharges, generation of corrosive by-products, and electrochemical degradation.

U.S. Pat. No. 4,189,392 (Raychem) discloses an electrical insulation material which comprises a polymeric material (which includes an anti-tracking filler) having an erosion-inhibiting, hydrophobic, non-ionic, fluorine-substituted compound incorporated into it, The erosion-inhibiting compound has a fluorine-substituted aliphatic carbon chain linked to a group having an affinity for the polymeric material and/or the anti-tracking filler. The patent discloses an enormous range of fluorine-substituted compounds for incorporation into the polymeric material. The fluorine-substituted aliphatic carbon chain comprises at least four carbon atoms, and preferably comprises from 6 to 18 carbon atoms. The fluorine-substituted carbon chain is preferably a fluorinated alkyl group, e.g. a hexyl, heptyl, octyl, nonyl or decyl group. Preferably one, and more preferably two, carbon atoms immediately adjacent to the link with the group having an affinity for the polymeric material and/or the anti-tracking filler is an unsubstituted —$CH_2$— group. The compound may have more than one fluorine-substituted aliphatic carbon chain, e.g. two such chains linked to a divalent group having an affinity for the polymeric material and/or the anti-tracking filler.

The fluorine-substituted carbon chain of U.S. Pat. No. 4,189,392 may be linked directly to the group having an affinity for the polymeric material and/or the anti-tracking filler, or it may be linked through an alkoxy, acyl, amide or ester linkage. Ester linkages are particularly preferred. The nature of the group having an affinity for the polymeric material and/or the anti-tracking filler depends upon the polymeric material into which the fluorine-substituted compound is to be incorporated and the filler used. Where the group has an affinity for the polymeric material, it may contain atomic groupings similar to those in the polymeric material. The patent states that where the polymeric material comprises a polyolefin or an olefin copolymer, the group having an affinity for the polymeric material may comprise a carbon chain containing up to about 100 carbon atoms, preferably 3 to 20 carbon atoms. When the polymeric material comprises an acrylate or methacrylate polymer, the group preferably contains polar moieties, for example ester, ether or amide groups. Similarly for epoxy resins, polyurethanes, polyethers and epichlorohydrin rubbers, groups containing epoxide, urethane or ether linkages may be used as appropriate. When the polymeric material comprises a silicone polymer, the group preferably contains one or more silicon atoms bonded to oxygen, carbon halogen, nitrogen or hydrogen, for example the group may contain one or more siloxane linkages, or a polysiloxane chain containing up to about 40, and preferably from 4 to 30, siloxane linkages. The group having an affinity for the polymeric material may comprise more than one of the groups and linkages listed above if desired.

As already mentioned, U.S. Pat. No. 4,189,392 refers to a very wide range of fluorine-substituted compounds which may be used. The patent also discloses a very large number of suitable specific compounds. One of these many compounds which is mentioned is perfluoro telomer azelate (MPD3712 manufactured by Du Pont). The patent states that this is believed to be the azelaic acid ester of $RfCH_2CH_2OH$ where Rf is mainly $C_4$–$C_6$ perfluoroalkyl.

SUMMARY OF THE INVENTION

Earlier in the present specification, it was stated that in moist conditions, high voltage polymeric insulation material is caused to degrade over time due to the cycle of high leakage currents, electrical discharge activity and attack by corrosive by-products. In practice, high voltage installations will not normally be subject to moisture condensation all of the time. Normally, such condensation will occur only during wet or humid weather, or overnight when the ambient temperature may fall below the dew point. After dawn during dry weather, the temperature may rise above the dew point, allowing the insulation material to dry out. The inventors of the present invention have found that if, during these dry periods, the insulation material regains its hydrophobicity (i.e. its ability to repel water), the gradual degradation of the material may be dramatically slowed down.

The inventors of the present invention have discovered that a specific, selected, small range of fluorine-substituted compounds, when incorporated as an additive into a polymeric insulation material, unexpectedly endows the insulation material with dramatically superior hydrophobicity retention and recovery (and consequent leakage current suppression under moist conditions), in comparison with previously used additive compounds.

According to a first aspect, the invention provides an electrical insulation material which is suitable for high voltage applications, comprising:

a) a polymeric material, and
b) an additive incorporated into the polymeric material, the additive comprising a compound of the formula:

where Rf and R'f are fluorine-substituted aliphatic chains, and x is an integer in the range 9 to 18.

According to a second aspect, the invention provides a compound suitable for use as an additive in a polymeric electrical insulation material which is suitable for high voltage applications, the compound having the formula:

where Rf and R'f are fluorine-substituted aliphatic carbon chains, and x is an integer in the range 9 to 18.

According to a third aspect, the invention provides the use of a compound of the formula:

where Rf and R'f are fluorine-substituted aliphatic carbon chains, and x is an integer in the range 9 to 18, as an additive in a polymeric electrical insulation material which is suitable for high voltage applications.

It is well known that surface hydrophobicity may be determined by means of contact angle measurements. (The larger the contact angle, the more hydrophobic is the surface.) Furthermore, it is now well accepted that so-called static or equilibrium contact angle measurements, apply only to the theoretical ideal surface, i.e. one that is atomically smooth and completely homogeneous (chemically and physically). In practice, of course, no surface is perfectly smooth and homogeneous. For real surfaces, it has been found that the so-called dynamic receding contact angle is a more reliable measure of hydrophobicity than is the static contact angle. This is believed to be because the most important aspect of surface hydrophobicity (at least in relation to high voltage insulation materials) is the manner in which water runs off the surface of the material. If a drop of water leaves a long trail of water which has "wetted-out" on the surface of the material as it runs down the surface, then the surface is clearly not very hydrophobic. If, on the other hand, a running drop of water leaves substantially no water trail, then the surface is clearly hydrophobic. A good (and repeatable) measure of whether or not a drop would leave a wet trail on a surface is the dynamic receding contact angle of a sessile drop on the surface. This is the contact angle of the drop measured while the liquid of the drop is being drawn up into a syringe or pipette at a constant rate. If the contact angle is small (say below 40°–50°), then the surface is not very hydrophobic, but if it is large (e.g. 40°–50° or above) then it is hydrophobic.

BRIEF DESCRIPTION OF THE FIGURES

FIG. 3 is a table of the contact angle measurements (in degrees) described below.

DETAILED DESCRIPTION OF THE INVENTION

Contact Angle Measurements

Figure 1:
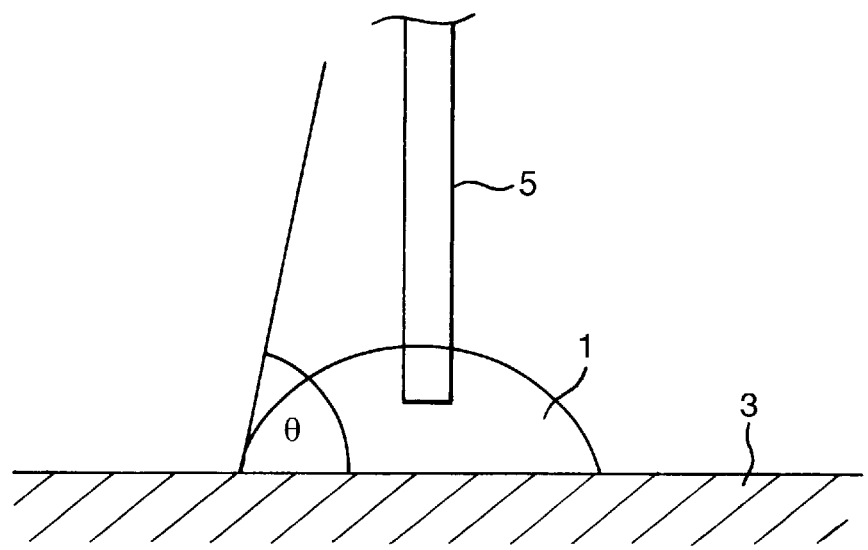
FIG. 1 is a schematic diagram illustrating the measurement of a contact angle using the "sessile drop" method.

Dynamic receding contact angle measurements were made by the well-known "sessile drop" method (with distilled water) using a "G2 Contact Angle System" apparatus manufactured by Kruss. A sessile drop contact angle is the angle through a drop of liquid 1 (see FIG. 1) on a flat horizontal surface 3, between the plane of the flat surface and the angle of the tangent of the edge of the drop where it contacts the surface 3. The drops of liquid 1 are placed on the flat horizontal surface 3 by means of a syringe 5. As mentioned above, a dynamic receding sessile drop contact angle is the contact angle of the drop measured while the liquid of the drop is being drawn back up into the syringe at a constant rate.

Dynamic receding sessile drop contact angle measurements were carried out on samples of five different electrical insulation materials, each of which had a composition as follows (percentages are by weight):

| | |
|---|---|
| EVA copolymer: | 49.35% |
| Alumina Trihydrate: | 37.13% |
| Miscellaneous anti-oxidants, pro-rads, uv screens, uv stabilizers, coupling agents, moisture scavengers and process aids: | 12.72% |
| Water-repellent additive compound mixture: | 0.80% |

Composition of Water-Repellent Additive Compound Mixture

| where, for each sample: | | |
|---|---|---|
| | y = 5, z = 5 | 20.05% |
| | y = 5, z = 7 | 31.83% |
| | y = 5, z = 9 or y = 7, z = 7 | 25.45% |
| | y = 5, z = 11 or y = 7, z = 9 | 13.02% |
| | y = 7, z = 11 or y = 9, z = 9 | 5.41% |
| | y = 9, z = 11 | 2.28% |
| | y = 11, z = 11 | 0.93% |

The integer x was different for each sample, as follows:

| | |
|---|---|
| Sample 1: | x = 4 |
| Sample 2: | x = 7 |
| Sample 3: | x = 10 |
| Sample 4: | x = 14 |
| Sample 5: | x = 20 |

A flat circular disc of each insulation material sample (2 mm thick, 25 mm diameter) was prepared. Sessile drop dynamic receding contact angles for distilled water were then measured for each disc. The flow rate in each case was 0.88 $\mu ls^{-1}$. Ten measurements were made per sample, and the average value was recorded.

Figure 2:
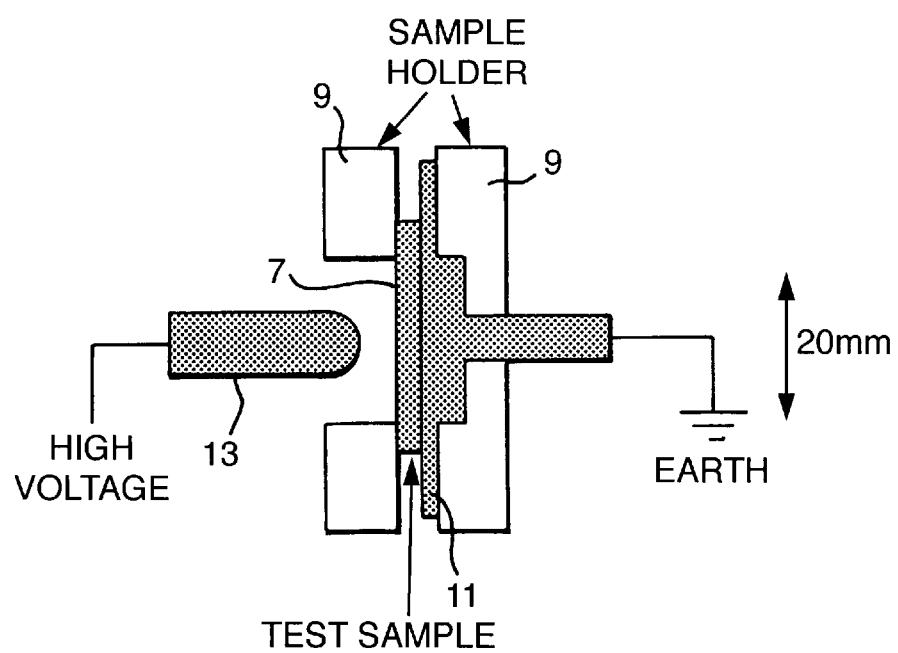
FIG. 2 is a schematic diagram of an apparatus used to expose test samples of polymeric insulation material to electrical discharge activity (as described below).

Each of the five discs in turn was then subjected to moisture and high voltage conditions, as follows:

The disc 7 was placed in an enclosed test chamber and mounted in a sample holder 9 as shown in FIG. 2. The sample holder was equipped with an earth electrode 11 of larger diameter than the disc, with which one entire side of the disc was in contact. Positioned adjacent to the opposite side of the disc was a cylindrical electrode 13 having a diameter of 10 mm, and a hemispherical end which at its closest point was spaced 5 mm away from the center of the disc.

The mounted disc 7 was then preconditioned in the enclosed test chamber for 20 minutes in an atmosphere of 100% humidity. The disc was then exposed to ten separate, immediately consecutive, 30 second periods of electrical discharge activity in which the cylindrical electrode was at a potential of 50 kV, 100 Hz a.c. (This was therefore an extremely severe test which was designed to test the insulation materials in harsher conditions than they would typically be exposed to in normal use.) The disc was then removed from the enclosed test chamber and dried by blowing it with compressed air.

Average sessile drop dynamic receding contact angles were then measured (as above) for the surface of the disc which had been exposed to the electrical discharge activity. These measurements were carried out at intervals of 20 minutes, 3 hours, and 24 hours after the electrical discharge exposure.

Figure 4:
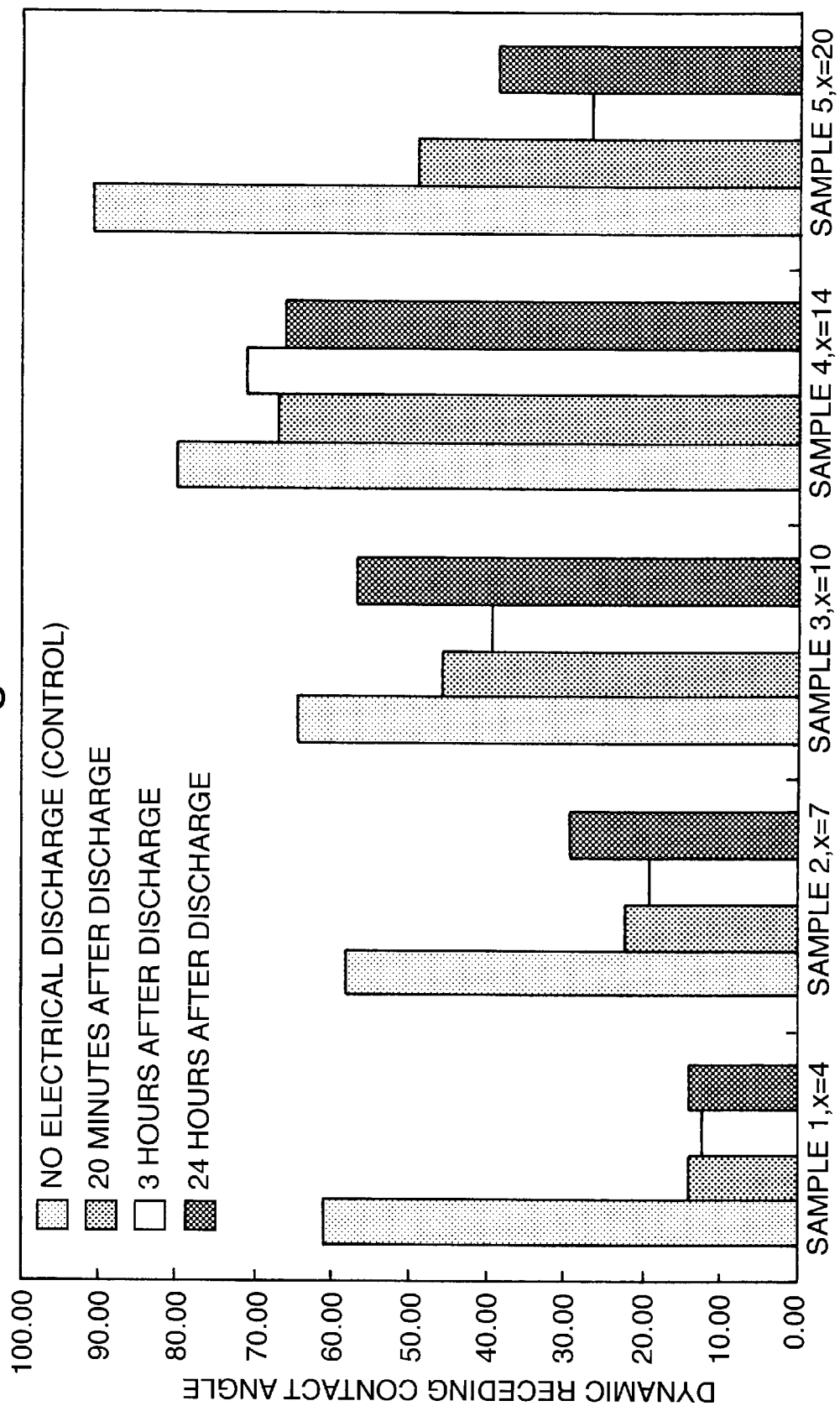
FIG. 4 is a bar chart illustrating the measurements recorded in FIG. 3.

The average sessile drop dynamic receding contact angle measurements for each sample are shown in the table of FIG. 3 and the chart of FIG. 4. As already mentioned, the larger the value of the contact angle, the more hydrophobic is the surface of the insulation material. The material is considered to be sufficiently hydrophobic if the sessile drop dynamic receding contact angle is at least about 40°–50°, preferably at least 50°.

These results are entirely unexpected. They show that two of the samples, namely Sample 3 (x=10) and Sample 4 (x=14), behaved very differently to the other three samples.

For samples 1, 2 and 5 (x=4, 7 and 20 respectively), the average receding contact angle fell dramatically following exposure to electrical discharges, compared to the contact angle prior to such exposure. For samples 1 and 2, the value of the contact angle 20 minutes after the electrical discharges ceased dropped to about 23% and 38% respectively, of the value prior to the electrical discharges, and for sample 5, this figure was about 54%. In contrast, the corresponding figures for samples 3 and 4 were about 70% and 84% respectively. Therefore, a short time after exposure to electrical discharge activity, samples 3 and 4 retained their hydrophobicity to a significantly greater extent than did samples 1, 2 and 5.

The contact angle figures for the measurements carried out 24 hours after the exposure to the electrical discharge activity are even more significant and surprising. For samples 1, 2 and 5, the contact angles were still only 23%, 50% and 42% respectively of their values prior to the electrical discharge exposure (and certainly below 50°). For samples 3 and 4, however, the contact angle values had recovered to about 88% and about 82% respectively, of their initial values (and certainly above 50°).

These are extremely significant findings because, as explained earlier, the ability of an insulation material to recover its hydrophobicity during a dry period following. electrical discharge activity in damp conditions is crucial to preventing, or at least slowing down, the gradual degradation of the insulation material over time. In particular, the ability of an insulation material to recover its hydrophobicity during a 24 hour period is important in practice, because of the 24 hour cycle of temperatures falling below the dew point at night (causing condensation on the insulation material) and rising above the dew point during the day (causing the insulation material to dry out).

PREFERRED EMBODIMENTS OF THE INVENTION

The additive compound according to the invention may be used in order to extend the length of time during which the polymeric material substantially retains its hydrophobicity in moist conditions during use in high voltage applications, in comparison with the polymeric material if the additive were not present. Additionally or alternatively, the additive compound may be used in order to enhance and/or to accelerate recovery of the hydrophobicity of the polymeric material in dry conditions following a reduction in hydrophobicity in moist conditions. Furthermore, the additive compound may be used in order to suppress the occurrence of leakage currents on the surface of the polymeric material.

It was mentioned above that the additive compound has the general formula:

$$Rf-O_2C(CH_2)_xCO_2-R'f$$

where Rf and R'f are fluorine-substituted aliphatic chains, and x is an integer in the range 9 to 18.

Preferably, the integer x is at least 10. It is preferably no greater than 17, more preferably no greater than 16, even more preferably no greater than 15, especially no greater than 14. The preferred range of x is therefore 10–14. A particularly preferred value of x is 10.

Rf and/or R'f are preferably fluorinated alkyl groups. More preferably, Rf and/or R'f are fluorinated alkyl groups of the formula:

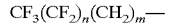

$$CF_3(CF_2)_n(CH_2)_m-$$

where n is an integer in the range 5 to 11, and m is 0, 1 or 2 (preferably 2).

In fact, the additive will normally be present as a mixture of such a range of compounds, in which the integer n of each fluorinated alkyl group is any of 5, 6, 7, 8, 9, 10 or 11. A particularly preferred mixture is described above, as used for the contact angle measurements.

The polymeric material of the insulation material may generally comprise any polymeric material suitable for high voltage applications. However, the preferred polymeric materials are polyolefins, olefin copolymers, substituted polyolefins, and substituted olefin copolymers. A particularly preferred polymer is ethylene-vinyl acetate copolymer (EVA), e.g. Elvax 470. Another preferred polymer is linear low-density polyethylene (LLDPE).

Other possible polymeric materials include acrylic rubbers, silicone polymers, epoxy resins, polyurethanes and polyethers. Any or all of the polymer materials may be combined, as appropriate.

The additive compound is preferably incorporated into the polymeric material in an amount equal to no greater than 5%, more preferably no greater than 4%, even more preferably no greater than 3%, of the mass of the polymeric material. Preferably the additive is present in an amount of at least 0.1%, preferably at least 0.2%, more preferably at least 0.3%, of the mass of the polymeric material. A preferred range is 0.5–2.5% by mass of the polymeric material, more preferably 0.7–1.5%, e.g. 0.8%.

Other additives may also be incorporated into the polymeric material. For example, the insulation material may include any or all of: fillers (e.g. alumina trihydrate), antioxidants (e.g. as mentioned below), pro-rads (e.g. as mentioned below), uv screening agents (e.g. zinc oxide and/or iron oxide), and moisture scavengers (e.g. antimony pentoxide), etc. For example, a radiation crosslinking promoter (a "pro-rad") may be chosen from among those conventionally used to promote the crosslinking of polymers, such as triallyl cyanurate (TAC), triallyl isocyanurate (TAIC), triallyl trimellitate, triallyl trimesate, tetraallyl pyromellitate, the diallyl ester of 1,1,3-trimethyl-5-carboxy-3-(4-carboxyphenyl)indane, trimethylolpropane trimellitate (TMPTM, e.g. Sartomer SR350M), pentaerythritol trimethacrylate, tri(2-acryloxyethyl) isocyanurate, tri (2-methacryloxyethyl) trimellitate, and the like, and combinations thereof.

An effective amount of an antioxidant (which can be a single compound or a combination of two or more compounds) may be added to increase thermal stability, forming an intimate mixture or blend with the polymers. Suitable antioxidants include alkylated phenols, e.g. those commercially available as Goodrite 3125™, Irganox B225™, Irganox 1010™(pentaerythrityl tetrakis-3-(3,5-di-tert-butyl-4-hydroxyphenyl)propionate, Irganox 1035™, Irganox 1076™(octadecyl 3-(3,5-di-tert-butyl-4-hydroxyphenyl)propionate), Irganox 1222™(phosphonic acid [[3,5-bis(1,1-dimethyl)-4-hydroxyphenyl]methyl]-diethyl ester), Irganox 1425 (phosphonic acid [[3,5-bis(1,1-dimethylethyl)4-hydroxyphenyl]methyl]-monoethyl ester, calcium salt), Irganox 3114™(1,3,5-tris-(3,5-di-tert-butyl-4-hydroxybenzyl)-isocyanurate), Topanol CA™(1,1,3-tris-(5-tert-butyl4-hydroxy-2-methylphe-nyl)butane), Irganox 1093™, and Vulkanox BKF™; organic phosphite or phosphates, e.g. dilauryl phosphite and Mark 1178™; alkylidene polyphenols, e.g. Ethanox 330™(1,3,5-tris-(3,5-di-tert-butyl-4-hydroxybenzyl)mesitylene); thio-bis-alkylated phenols, e.g. Santonox R™(4,4'-thiobis-(3-methyl-6-tert-butylphenol) and polymerized derivatives thereof; dilauryl thio-dipropionate, e.g. Carstab DLTDP™; dimyristyl thiodipropionate, e.g. Carstab DMTDP; distearyl thiodipropionate (DSTDP), e.g. Cyanox STDP; amines, e.g. Wingstay 29, and the like. Combinations of antioxidants can be used. Preferably, the antioxidant is used in an amount of between 0.1% and 5%, more preferably between 0.2% and 2%, per cent by weight based on the weight of the composition.

According to a fourth aspect, the invention provides an article for providing electrical insulation in high voltage applications, the article comprising an electrical insulation material according to the first aspect of the invention.

The electrical insulation material is preferably crosslinked (e.g. by means of an electron beam, although other methods may be used).

Advantageously, the electrical insulation material may be recoverable (e.g. shrinkable). This may be achieved by expanding the material and holding it in its expanded state (e.g. by means of a hold-out device) prior to installation. Installation may then be achieved by allowing the material to recover (e.g. by removal of a hold-out device). Preferably, however, the electrical insulation material is heat-recoverable, e.g. heat-shrinkable.

The article may be formed by molding or extruding the insulation material, for example. A preferred shape of article is a tube.

The electrical insulation material may be used in a great many applications where electrical components are exposed to voltages of above about 1 kV. It may be used in electrical power transmission systems, for example as an insulation material for high voltage components, insulators of all types, particularly for cable terminations, joints, fuse covers, transformer covers, bushings and sheds, for example.

What is claimed is:

1. An electrical insulation material which is suitable for high voltage applications, comprising:

(a) a polymeric material; and
   (b) an additive incorporated into the polymeric material in which the mass of the additive is 0.5 to 2.5% of the mass of the polymeric material, and in which the additive is a mixture of compounds, said mixture including a compound from each of i) through vii) below:

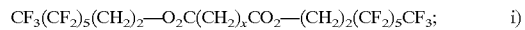

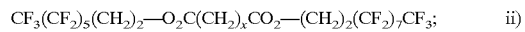

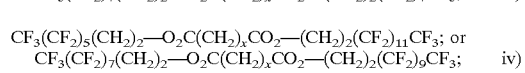

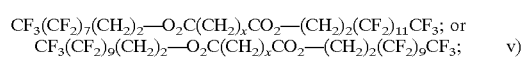

and

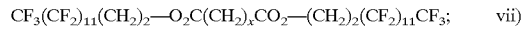

where x is an integer independently selected for each compound from the range 10 to 14.

2. An electrical insulation material which is suitable for high voltage applications, comprising:

(a) a polymeric material; and
   (b) an additive incorporated into the polymeric material in which the mass of the additive is 0.7 to 1.5% of the mass of the polymeric material, and in which the additive is a mixture of compounds, said mixture including a compound from each of i) through vii) below:

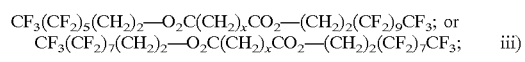

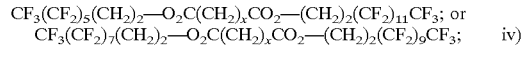

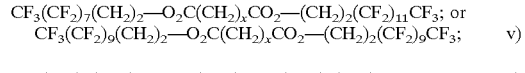

and

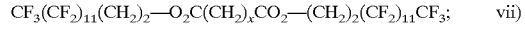

where x is an integer independently selected for each compound from the range 10 to 14.

3. A material according to claim 1, wherein x is 10.

4. A material according to claim 2, wherein x is 10.

* * * * *